United States Patent [19]

Staib et al.

[11] Patent Number: 5,762,318
[45] Date of Patent: Jun. 9, 1998

[54] ELECTROHYDRAULIC PRESSURE ADJUSTER FOR A SLIP-CONTROLLED VEHICLE BRAKE SYSTEM

[75] Inventors: Helmut Staib, Schwieberdingen; Guenther Glock, Steinheim; Michael Friedow, Tamm; Juergen Lander, Stuttgart; Ulrich Pechtold, Tamm, all of Germany

[73] Assignee: Robert Bosch GmbH, Stuttgart, Germany

[21] Appl. No.: 722,199

[22] PCT Filed: Mar. 27, 1995

[86] PCT No.: PCT/DE95/00410

§ 371 Date: Oct. 15, 1996

§ 102(e) Date: Oct. 15, 1996

[87] PCT Pub. No.: WO95/28303

PCT Pub. Date: Oct. 26, 1995

[30] Foreign Application Priority Data

Apr. 13, 1994 [DE] Germany .................. 44 12 664.6

[51] Int. Cl.$^6$ .................. F16K 31/02; B60T 8/32
[52] U.S. Cl. .................. 251/129.15; 303/119.2
[58] Field of Search .................. 251/129.15, 129.01; 303/119.2; 137/884

[56] References Cited

U.S. PATENT DOCUMENTS

| 5,040,853 | 8/1991 | Burgdorf et al. | 303/119.2 |
| 5,275,478 | 1/1994 | Schmitt et al. | 303/119.2 |
| 5,407,260 | 4/1995 | Isshiki et al. | 303/119.2 |
| 5,449,226 | 9/1995 | Fujita et al. | 303/119.2 X |
| 5,466,055 | 11/1995 | Schmitt et al. | 303/119.2 |

*Primary Examiner*—Kevin Lee
*Attorney, Agent, or Firm*—Edwin E. Greigg; Ronald E. Greigg

[57] ABSTRACT

A pressure adjuster that has at least one valve, united with a valve block, with a valve dome that protrudes from the valve block. A cap includes a coil which is slipped over the valve dome. Electrical contact elements extend from both the coil and the cap and are joined together in a material bond. The electrical contact elements of the coil and of the cap are embodied resiliently. The electrical contact elements effect both the electrical connection and the mounting function for the coil. Moreover, the electrical contact elements allow aligning the coil as it is slipped onto the valve dome. The electrohydraulic pressure adjuster can be used in slip-controlled vehicle brake systems.

5 Claims, 2 Drawing Sheets

5,762,318

1

ELECTROHYDRAULIC PRESSURE ADJUSTER FOR A SLIP-CONTROLLED VEHICLE BRAKE SYSTEM

PRIOR ART

The invention is based on an electrohydraulic pressure adjuster as generically defined hereinafter.

From international patent disclosure WO-A 92/08630, which defines this generic type, an electrohydraulic pressure adjuster is known which has a cap with a bottom to which a flexible circuit board is secured, while coils for electromagnetically actuatable valves are disposed underneath the bottom. The coils have electrical contact elements in the form of straight connection wires, each extending parallel to the longitudinal axis of the coils and reaching through a respective opening in the bottom. There, the connection wires are joined by a material bond to flexible prongs of the circuit board. A rubber-elastic sealing stopper is also received in prestressed fashion in each opening of the bottom. With frictional engagement, the stopper envelops both the respective connection wire over a portion of its length and a tang, on the side toward the coil, from which the connection wire extends. Since the flexible prongs can support the coils to only a limited extent, the task of mounting of the coils is substantially taken on by the sealing stopper and to a small extent by the connection wires. The sealing stoppers restrict the elasticity of the mounting of the coils both axially and radially, however.

From published German patent application DE 41 00 967 A1, a pressure adjuster is also known, in which the coils of magnet valves are suspended elastically resiliently from a hoodlike cap, so that they can be aligned relative to a valve block when they are joined to the valve block. To that end, elastic mounts are provided that extend from a support element of the cap and engage the coils. They allow radial and axial yielding of the coils. Moreover, the coils are joined by electrical contact elements to an electronic controller received in the cap. These contact elements must also be embodied resiliently, so that they can follow along with the alignment motion of the coils. The electrical contact elements may be disposed inside the elastic mounts. The expense for the elastic mounting of the coils and contacting them resiliently to the controller is therefore relatively high.

ADVANTAGES OF THE INVENTION

The pressure adjuster according to the invention has the advantage over the prior art that the electrical contact elements, especially of the cap, that also serve to retain the coil furnish increased elastic resilience crosswise to the longitudinal axis of the coil, or in other words in the direction in which the coil must deflect if there is an axial offset when the coil is mounted on the valve dome. Thus, the coil can be well aligned relative to the valve dome, and the attendant strains do not cause breakage or separation of the integral elements, which nevertheless are able to support the weight of the coil.

By means of the provisions recited herein, advantageous further features of and improvements to the pressure adjuster are possible.

The embodiment of the invention as defined herein has the advantage that an intimate connection between the wire and the fastening lug is attained, despite a reduced positional precision.

Expedient shapings for the connection wires are also set forth.

2

The embodiment of the invention as recited herein facilitates making the connection and monitoring the connection visually.

With further provisions, a high axial positional precision of the coil is advantageously attained, so that the coil alignment relative to the valve dome is effected substantially only in the radial direction. This keeps the strain on the integral elements slight. The embodiments recited herein define advantageous provisions for a low-strain embodiment of the integral elements.

BRIEF DESCRIPTION OF THE DRAWINGS

Two exemplary embodiments of the invention are shown in simplified form in the drawing and described in further detail in the ensuing description.

DESCRIPTION OF THE EXEMPLARY EMBODIMENTS

Figure 1:
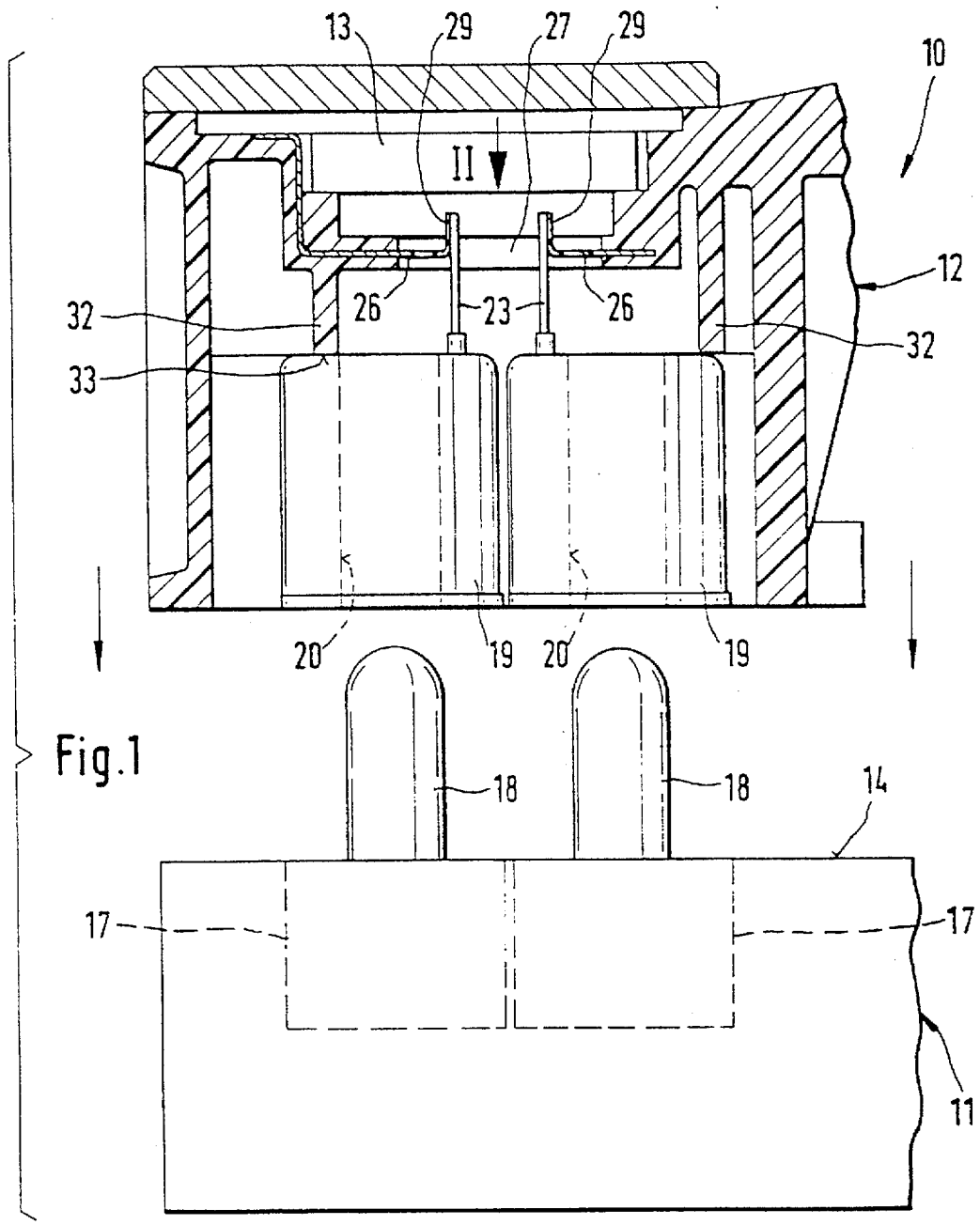
FIG. 1 is a view of a pressure adjuster when a cap, shown in cross section, with coils is joined to a valve block shown below the cap.

In FIG. 1, reference numeral 10 indicates an electrohydraulic pressure adjuster for a slip-controlled vehicle brake system, not shown. The pressure adjuster 10 substantially comprises a valve block 11 and a hoodlike cap 12 with an electronic control unit 13 disposed in the hoodlike cap. In the finished state of the pressure adjuster 10, the cap 12 is joined to the valve block 11 along a support face 14, which the cap 12 engages with fasteners, not shown. The view in FIG. 1, as indicated by arrows, shows a state in which the cap 12 is about to be joined to the valve block 11.

Figure 2:
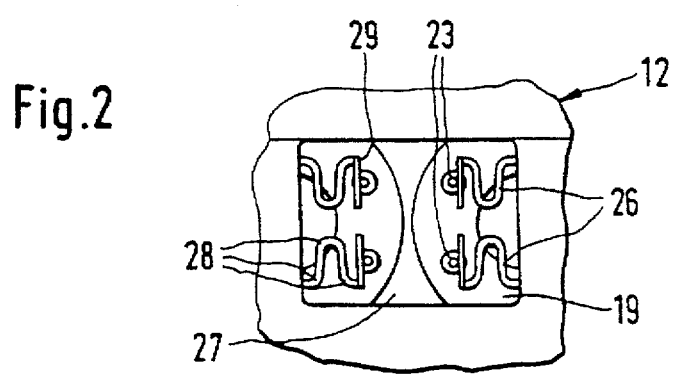
FIG. 2 shows a detail of FIG. 1, seen in the direction of the arrow II, with elements serving the purpose of mounting and contacting located between the coils and the cap.
Figure 3:
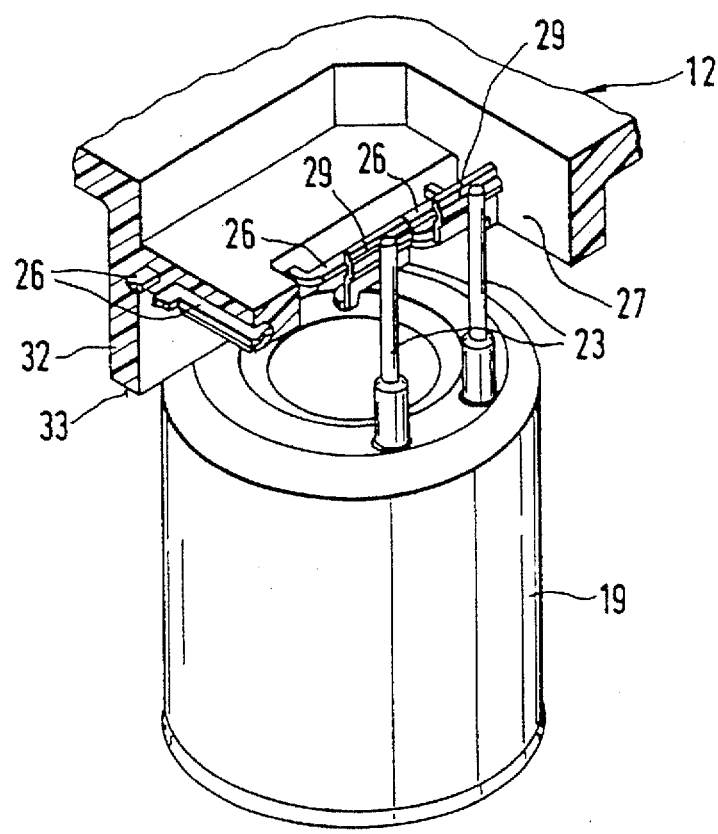
FIG. 3, in a perspective view, shows a first exemplary embodiment of these elements.

Electromagnetically actuatable valves 17 are received in the valve block 11. They have a valve dome 18 that protrudes from the valve block 11 at right angles to the support face 14. For actuating each of the valves 17, one coil 19, comprising a winding, winding carrier, connection wires and a magnetic flux carrying jacket, is received in the cap 12. These coils have an inner bore 20, whose diameter is adapted to fit the diameter of the valve domes 18. When the cap 12 is lowered onto the valve block 11, the coils 19 are aligned relative to the valve domes 18 and slipped onto the valve domes. This is accomplished by means of the following provisions, explained with reference to one coil 19:

On its side remote from the valve block 11, the coil 19 is provided with electrical contact elements in the form of two connection wires 23. In the first exemplary embodiment shown in FIGS. 1–3, the connection wires 23 are stretched and extend parallel to the longitudinal axis of the inner bore 20, which at the same time is the longitudinal axis of the coil, and, in the finished state of the pressure adjuster 10, of the valve dome 18 as well. The connection wires 23 are circular in cross section; however, they can also have a square cross section (as in the second exemplary embodiment of FIG. 4). The connection wires 23 are seated, in a manner fixed against relative rotation, in the winding carrier of the coil 19.

For the electrical connection of the coils 19 to the control unit 13, electrical contact elements of the cap 12 are provided in the form of narrow stamped grid strips 26 that are anchored in the cap. The stamped grid strips 26, which are cast integrally in the cap 12 made of an insulating material, emerge by their free end portion from the cross section of the wall of the cap through an opening 27 in the wall through which the connection wires 23 of the coil 19 pass. The stamped grid strips 26 extend in a plane that is at right angles to the longitudinal axis of the coil 19, and inside the opening 27 they have meandering offsetting bends 28. Because of this shaping, and their length and cross section, the stamped grid strips 26 have a relatively high elastic resilience in a plane extending at right angles to the longitudinal axis of the coil 19. On their free end, the stamped grid strips 26 have a fastening lug 29, which extends parallel to the associated connection wire 23 and is joined to the wire 23 by a material bond, that is, by welding or soldering.

This joining operation can take place as follows: The coil 19 is received in an auxiliary device that replaces the valve block 11 and valve dome 18. A plurality of coils 19 are thus given their positionally correct association, both axially and mutually, as well as with respect to the connection wires 23. The cap 12 is lowered from above with its free opening 27 over the coils 19 and thus fixed positionally correctly on the auxiliary device with respect to the coils 19, so that the connection wires 23 extend along the fastening lugs 29 of the stamped grid strips 26. In this position, the coils 19 are axially braced on a support face 33 created by means of ribs 32 in the cap 12. The material bond of the stamped grid strips 26 with the connection wires 23 is now established, in the opening 27 of the cap 12 which is freely accessible from the side remote from the coil.

Once the cap 12 has been completed with the control unit 13 and other elements, not shown, of the pressure adjuster 10, this component unit is intrinsically complete. The joined connection wires 23 of the respective coil 19 and the stamped grid strips 26 of the cap 12 take on the task of both electrically connecting the coil to the control unit 13 and retaining the coil received in the cap. In other words, the connection wires 23 and the stamped grid strips 26 are embodied as integral elements both for the electrical connection of the coil 19 and control unit 13 and for the resilient mounting of the alignable coil in the cap 12. This resilience can be made use of as follows:

When the valve 17 is united with the valve block 11, unavoidable tolerances arise with respect to both the position of the valve dome 18 and its axial course. When there are multiple valves in the valve block 11, their mutual association also involves tolerances. When the cap 12 is joined to the valve block 11, the individual coil 19 is capable of following along with these deviations, if the valve dome 18 engages the inner bore 20 of the coil. In the process, the connection wires 23 and the stamped grid strips 26 undergo an elastic deformation, which does not threaten the material bond of the parts. The dimensioning of the contact elements of the coil 19 and cap 12 is moreover such that when the component unit is transported and joined to the valve block 11, no permanent deformation of the connection wires 23 or the stamped grid strips 26 occurs. An overload on the contact elements when the cap 12 is mounted on the valve block 11 is avoided by the engagement of the respective coil 19 with the support face 14 of the valve block, on the one hand, on with the support face 33 of the cap, on the other.

Figure 4:
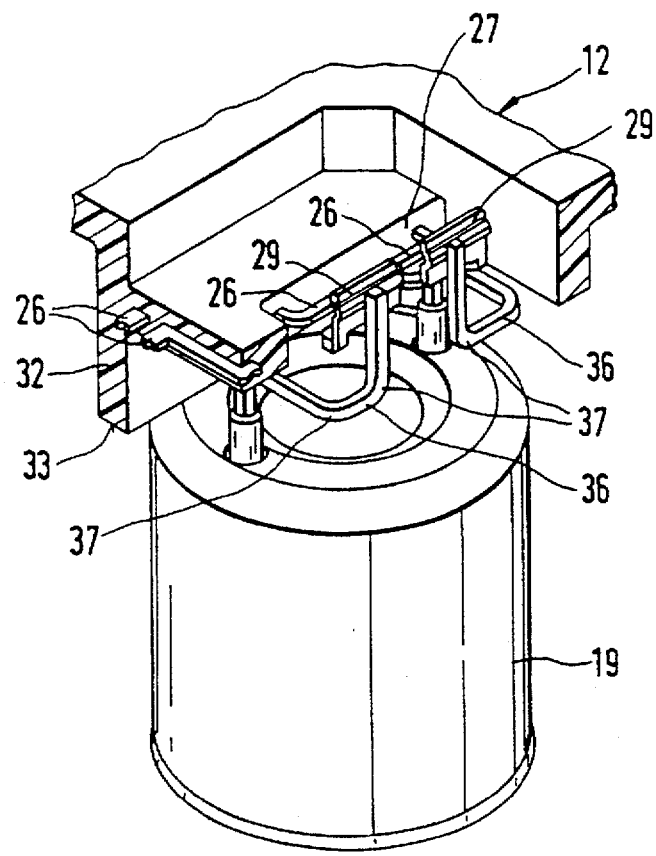
FIG. 4 shows a second exemplary embodiment of the elements in a view corresponding to FIG. 3.

In the second exemplary embodiment of FIG. 4, the connection wires 36 of the coil 19 are involved to a greater extent in the resilience of the coil mounting. Specifically, the connection wires 36 are bent multiple times in planes extending at right angles to one another. Nevertheless, despite these offsetting bends 37, the free end of the connection wires 36 extends, as in the first exemplary embodiment, parallel to the longitudinal axis of the coil, and is joined with a material bond to the corresponding fastening lug 29 of the associated stamped grid strip 26.

In a departure from the exemplary embodiments described, both the stamped grid strips 26 and the connection wires 23 or 36 of the coil 19 may extend in planes that are not at right angles to one another. Also, both the stamped grid strips 26 and the connection wires 23 and 36 may have a wavelike course, for the sake of attaining sufficient resilience in the alignment and mounting of the coil 19 on the valve dome 18. If the positional tolerances are closed, however, it may also be sufficient to embody both the connection wires 23 (as in the first exemplary embodiment) and the stamped grid strips 26 in stretched form and to utilize the elastic resilience of such a shaping.

The foregoing relates to preferred exemplary embodiments of the invention, it being understood that other variants and embodiments thereof are possible within the spirit and scope of the invention, the latter being defined by the appended claims.

What is claimed and desired to be secured by U.S. Letters Patent is:

1. An electrohydraulic pressure adjuster (10), for a slip-controlled vehicle brake system, comprising at least one electromagnetically actuatable valve (17), which is united with a valve block (11) and has both a valve dome (18) that protrudes from the valve block and a coil (19) that is aligned with and slipped onto the valve dome, a cap (12) covers the coil (19) and the valve dome (18), materially bonded electrical contact elements (23, 26, 36) extending from both the coil (19) and the cap (12) for an electrical connection of the coil to a control unit (13), wherein the electrical contact elements (23, 36) of the coil (19), extend with their ends parallel to the longitudinal axis of the coil (19) and are materially connected to the contact elements (26) of the cap (12) before the cap (12) is mounted on the valve blocks 11, and the electrical contact elements (23, 36) of the coil (19) and the electrical contact elements (26) of the cap (12), are resilient mounts in which the electrical contact elements (26) extend at right angles to the longitudinal axis of the coil for alignment of the coil (19) relative to the valve dome (18), the grid strips (26) are narrow, stamped grid strips which are anchored in the cap (12) and provided as electrical contact elements and said stamped grid strips have meandering offsetting bends (28).

2. An electrohydraulic pressure adjuster in accordance with claim 1, in which the stamped grid strips (26), have a fastening lug (29) on a free end, which extends parallel to and is united in a material bond with an associated connection wire (23, 36).

3. An electrohydraulic pressure adjuster in accordance with claim 2, in which the connection wires (23, 36) have a circular or square cross section.

4. An electrohydraulic pressure adjuster in accordance with claim 2, in which the cap (12) has an opening (27), through which the connection wires (23, 36) and the stamped grid strips (26) are accessible for making a material bond between them.

5. An electrohydraulic pressure adjuster (10), for a slip-controlled vehicle brake system, comprising at least one electromagnetically actuatable valve (17), which is united with a valve block (11) and has both a valve dome (18) that protrudes from the valve block and a coil (19) that is aligned with and slipped onto the valve dome, a cap (12) that covers the coil (19) and the valve dome (18), materially bonded electrical contact elements (23, 36) that extend from the coil (19) and electrical contact elements 26 that extend from the cap (12) for an electrical connection of the coil to a control unit (13), wherein the electrical contact elements (23, 36) of the coil (19), extend at least with their ends parallel to a longitudinal axis of the coil (19), and the electrical contact elements (26) of the cap (12) are resilient mounts that extend at right angles to the longitudinal axis for alignment of the coil (19), said electrical contact elements (26) are narrow, stamped grid strips which are anchored in the cap (12) that have meandering offsetting bends (28), the stamped grid strips (26) have a fastening lug (29) on a free end, which extends parallel to and is united in a material bond with an associated electrical contact element (23, 36), the cap (12) has an opening (27), through which the electrical contact elements (23, 36) and the stamped grid strips (26) are accessible for making a material bond between them, and the cap (12) has a support face (33), against which the coil (19) is axially braced while the material bond is being made and after the cap has been slipped onto the valve dome (18).

* * * * *